United States Patent Office 3,728,193
Patented Apr. 17, 1973

3,728,193
TERTIARYBUTYLSTYRENE/BUTADIENE BLOCK COPOLYMERS AS ADHESIVES
Leland Dennis McKeever and Wen-Jiu Cheng, Midland, Mich., assignors to The Dow Chemical Company, Midland, Mich.
No Drawing. Filed Oct. 12, 1970, Ser. No. 80,205
Int. Cl. C09j *3/00;* B32b *27/06*
U.S. Cl. 156—334    5 Claims

ABSTRACT OF THE DISCLOSURE

Adhesive copolymers of tertiarybutylstyrene and butadiene which show high adhesive strength are polymers which contain 1 to 50 weight percent tertiarybutylstyrene, 99 to 50 weight percent butadiene and have inherent viscosities of from 0.5 to 4 deciliters per gram.

---

Block copolymers of styrene and butadiene are well known, as are methods for the preparation thereof. Styrene/butadiene block copolymers have been of value in the field of adhesives.

It would be desirable if there were available improved block copolymers showing improved adhesion.

Block copolymers of styrene and butadiene and the method of preparation are shown in U.S. Pats. 3,031,432; 3,144,429; 3,149,182; 3,198,774; 3,231,635 and 3,317,918, the foregoing patents are herewith incorporated by reference. These methods are suitable for the preparation of tertiarybutylstyrene/butadiene polymers.

Highly adhesive block copolymers in accordance with the present invention are tertiarybutylstyrene and butadiene of either the ABA configuration or AB configuration or mixtures thereof wherein A represents a block of tertiarybutylstyrene polymer and B represents a block of butadiene polymer. Useful polymers in accordance with the present invention contain from about 20 to 50 weight percent tertiarybutylstyrene and from about 80 to 50 weight percent polybutadiene and have an inherent viscosity of from about 0.5 to 4 deciliters per gram. Such block copolymers in accordance with the present invention are readily prepared employing lithium-based catalysts as set forth in the patents incorporated herein by reference. The tertiarybutylstyrene employed in the present invention may be any one of the isomers or a mixture of all three of the possible isomers.

By way of further illustration, a plurality of ABA tertiarybutylstyrene/butadiene block copolymers are prepared by polymerizing in cyclohexane employing secondary butyllithium initiator, the total amount of tertiarybutylstyrene permitted to polymerize and the remaining butadiene and tertiarylbutylstyrene added sequentially and permitted to polymerize completely. On completion of polymerization, methanol is added to deactivate remaining lithium and 0.3 percent of an antioxidant commercially available under the trade designation of "Ionox" is also added. The solution is devolatilized in a vacuum oven at 50° C. for a 12 hour period. The resultant polymers have the appearance of a highly elastic vulcanized rubber. The compositions and inherent viscosity of the polymer are set forth in Table I below.

TABLE I

| Copolymer | Composition (wt. percent) | | | |
|---|---|---|---|---|
| | TBS[a] | B[b] | TBS[a] | $\eta_{inh}$ [c] |
| 1 | 19 | 62 | 19 | 1.8 |
| 2 | 23.5 | 53 | 23.5 | 1.7 |
| 3 | 12.2 | 75.6 | 12.2 | 0.9 |
| 4 | 20 | [d] 60 | 20 | 0.5 |
| 5 | 22 | 56 | 22 | 0.5 |
| 6 | 23 | 54 | 23 | 1.19 |

[a] Tertiarybutylstyrene.
[b] Butadiene.
[c] Inherent viscosity, concentration=0.3 gram copolymer per 100 milliliter toluene.
[d] Isoprene.

A plurality of samples are prepared for adhesion evaluation. Test samples measure 1 x 3 inches. Two portions to be joined are overlapped to provide a lap joint having an area measuring 1 x 1 inch. The polymers are applied to each portion of the substrate as a solution, pressed together and air-dried. Shear strength at break is measured on a tensile testing machine wherein the jaws are operated at a speed of 0.05 inch per minute. Metal samples are polished stainless steel, glass samples are microscope slides and polytetrafluoroethylene samples are 1 inch x 3 inch by 0.06 inch sheet. The results are set forth in Table II below.

TABLE II

Lap shear strength (Pounds per square inch)

| Copolymer | Metal-to-metal | | | | | Glass-to-glass | | Polytetrafluoroethylene [1] |
|---|---|---|---|---|---|---|---|---|
| | A | B | C | D | E | D | E | |
| 1 | | | | 97 | 0.0003 | 13 | | |
| 2 | 108 | 163 | 145 | 86 | 0.0001 | 31.7 | 0.0028 | |
| 3 | 53 | | | 69 | 0.0004 | 40.5 | 0.0017 | |
| 6 | | | | | | | | 75 |
| Solution: | | | | | | | | |
| I | 32 | | | | | | | |
| II | 46 | | | | | | | |
| III | | | | 58 | 0.0008 | 13 | 0.0019 | |
| 8 | 7.5 | 78 | | 17 | 0.001 | 13 | 0.0025 | 1.1 |
| 9 | | 94 | 36 | 41 | 0.0003 | 2 | 0.0012 | 3.3 |

[1] Prepared according to note D below.
NOTES:
A=No load in drying sample. Solution made up of 2 grams polymer in 10 cubic centimeters cyclohexane.
B=65 gram load in drying sample. Solution made up of 2 grams polymer in 10 cubic centimeters toluene.
C=130 gram load in drying sample. Solution made up of 2 grams polymer in 10 cubic centimeters toluene.
D=65 gram load in drying sample. Solution made up of 1 gram polymer 10 cubic centimeters toluene.
E=Film thickness—inch.
Solution:
I=Polymer mixtures, where copolymer 2:copolymer 4=1:1.
II=Polymer mixtures, where copolymer 3:copolymer 5=1:1.
III=Polymer mixtures, where copolymer 4:copolymer 2=1:4.
Copolymers 8 and 9 are commercially available styrene/butadiene block copolymers sold under the trade designations of Kraton 101 and Solprene 406, respectively.

Similar advantageous and beneficial results are obtained when copolymers of like composition are employed, but for AB structure rather than ABA structure.

Qualitative evaluation of the copolymers in accordance with the present invention indicate that they act as excellent adhesives for metals, including lead, steel, brass, silver, gold, stainless steel, sodium, potassium, aluminum and the like; they are also excellent adhesives for substrates such as wood; leather; paper; fabrics such as cotton, wool, linen, silk, as well as synthetic fabrics of nylon, polyester, rayon (both viscose and acetate), acrylonitrile, polymer fabrics and the like; asbestos; stone, including soap stone, granite, dolomite and the like; and are eminently satisfactory adhesives for synthetic resins, such as acetyl, acrylic, acrylonitrile, butadiene, styrene, cellulose acetate butyrate, cellulose propionate, chlorinated polyether, chlorinated polyvinylchloride, polychlorotrifluoroethylene, ethyl cellulose, ethyl vinyl acetate, fluorinated ethylene propylene ionomer, nylon 6/6, nylon 6/10, nylon 12, polycarbonate resins, polyethylene (high, medium and low density), polyphenylene oxide, polypropylene, polystyrene, polysulfone, polyurethane, polytetrafluoroethylene, plasticized polyvinylchloride, rigid polyvinylchloride, styrene acrylonitrile, polyethylene terephthalate; thermosetting resins such as glass reinforced alkyd resins; epoxy resins; melanine resins (both filled and unfilled); phenolic resins (filled and unfilled); urea-formaldehyde resins and the like.

The block copolymers of the present invention adhere to all clean, solid surfaces, and in many cases to surfaces that have been contaminated with low molecular weight oils.

Copolymers employed as adhesives in accordance with the present invention exhibit desirable adhesive properties over a broader range of temperatures than can be obtained when the corresponding styrene/butadiene block copolymers are employed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. Adhesive block copolymers of tertiarybutylstyrene and butadiene of either AB configuration or ABA configuration, wherein A represents a block of tertiarybutylstyrene polymer and B represents a block of the butadiene polymer wherein the copolymer contains from about 20 to 50 weight percent tertiarybutylstyrene and from about 80 to 50 weight percent polybutadiene, the polymer having an inherent viscosity of from about 0.5 to 4 deciliters per gram, in contact with first and second substrates and adhering said substrates together.

2. The polymer of claim 1 wherein one of the substrates is polytetrafluoroethylene.

3. A method of adhering solid substrates together, the steps of the method comprising disposing on the surface of a substrate a layer of a block copolymer of tertiarybutylstyrene and butadiene having either the ABA configuration or AB configuration or mixtures thereof, wherein A represents a block of tertiarylbutylstyrene polymer and B represents a block of butadiene polymer, the block copolymer containing from about 20 to 50 weight percent of tertiarybutylstyrene copolymerized therein, and from about 80 to 50 weight percent butadiene polymerized therein, the block copolymer having an inherent viscosity of from about 0.5 to 4 deciliters per gram, and subsequently contacting the block copolymer with a generally opposed surface to be joined.

4. The method of claim 3 wherein the block copolymer is deposited on at least one of the surfaces to be joined as a solution in a solvent for the block copolymer and removing at least a major portion of the solvent prior to contacting the surfaces.

5. The method of claim 4 wherein at least one of the surfaces is a polytetrafluoroethylene body.

References Cited

UNITED STATES PATENTS

| | | | |
|---|---|---|---|
| 3,137,682 | 6/1964 | Carson et al. | 260—88.2 C |
| 3,239,478 | 3/1966 | Harlan, Jr. | 260—880 B |
| 3,560,593 | 2/1971 | Hsieh | 268—879 |
| 3,513,056 | 5/1970 | Middlebrook | 260—879 |

JOHN D. WELSH, Primary Examiner

U.S. Cl. X.R.

161—189; 260—880 B